United States Patent Office 3,523,140
Patented Aug. 4, 1970

3,523,140
PROCESS FOR THE PRODUCTION OF
IODOPENTAFLUOROETHANE
Italo Cammarata, Bollate, Milan, and Martino Vecchio, Milan, Italy, assignors to Montecatini Edison S.p.A., Milan, Italy
No Drawing. Filed Oct. 17, 1967, Ser. No. 675,761
Claims priority, application Italy, Oct. 19, 1966, Patent 782,039
Int. Cl. C07c 17/08
U.S. Cl. 260—653.6                                      6 Claims

ABSTRACT OF THE DISCLOSURE

Iodopentafluoroethane of high purity is obtained in very high yields by reacting HF, $PbO_2$ and iodine with $C_2F_4$, at temperatures from 25° to 200° C., under pressures from 5 to 50 ata., the molar ratio $HF/C_2F_4$ ranging from 2 to 25, the molar ratio $PbO_2/C_2F_4$ ranging from 0.1 to 2, the molar ratio $I_2/C_2F_4$ ranging from 0.1 to 2. Iodopentafluoroethane is recovered from the gaseous reaction mixture by condensation at low temperature.

BACKGROUND OF THE INVENTION

The present invention concerns a process for the preparation of iodopentafluoroethane, and more particularly it relates to a process for the production of iodopentafluoroethane by iodofluorination of tetrafluoroethylene by means of $I_2$, HF, and $PbO_2$.

The iodo-fluorocarbons in general have several and useful applications. Particularly important is their use as telogens in telomerization reactions for the production of open-chain polymers of low molecular weight, usually called telomers. In particular, the iodopentafluoroethane may be brought to react with olefines and fluoroolefins in order to give alkyl- or fluoroalkyl iodides of greater molecular weight; it may also react with metals in order to give compounds useful as polymerization initiators.

Several processes are known for the preparation of iodopentafluoroethane. Some of these processes describe the reaction of tetrafluoroethylene with iodopentafluoride, alone or in admixture with $I_2$, in the presence or not of catalysts based on metallic Al, Mg, Th, Be, Ca, Sr or halides of antimony, tin etc.

Other known processes are based on the reaction between fluoroalkyl mercurial compounds and iodine, under the action of ultraviolet light and of heat. Other known processes are based on the reaction among HF, $I_2$ and $C_2F_4$ in the presence of HgO. Still other known processes are based on the reaction between $C_2F_4$ and $I_2$ in the presence of metal fluorides.

These known processes show, however, different drawbacks which make their application not fully satisfactory. One of the drawbacks of the processes that use iodopentafluoride, is that the preparation and use of said compound carry with them a considerable dangerousness.

Iodopentafluoride, furthermore, is an expensive product because the starting material is fluorine and its use involves considerable corrosion problems.

Another disadvantage of the known processes lies in the use of fluoroalkyl mercurials which are highly poisonous and volatile. The same disadvantage is shown by the known processes in which $C_2F_4$ is made to react with $I_2$ and HF in the presence of HgO, in as much as also in these processes the fluoroalkyl mercurials may form as products of secondary reactions or as intermediates of the main reaction. Still another drawback is represented by the fact that HgO is a rather expensive product; a further disadvantage arises from the fact that in the process wherein HgO and $I_2$ are used, $HgI_2$ is formed as a by-product, which must be recovered because of its high cost, and then regenerated into HgO and $I_2$ by means of a particularly uneconomical process.

An object of this invention is to provide a process free from the drawbacks of the hitherto known processes.

Another object of this invention is to provide a process of the character described which is economical, efficient and of easy performance.

Another object of this invention is to provide a process capable of producing iodopentafluoroethane of particular purity and ensuring very high yields.

These and still other objects will be achieved by operating according to the invention, which actually offers several advantages.

One advantage of the process according to this invention lies in the general safety of its initiation and progress, in as much as both the starting substances as well as the products and eventual by-products do not have poisonous characteristics.

Another advantage lies in the fact that by operating according to the invention a starting material of low cost is used such as $PbO_2$, whose consumption does not influence the economical convenience of the process.

THE INVENTION

According to this invention iodopentafluoroethane is obtained by reacting HF, $PbO_2$ and iodine with $C_2F_4$, at temperatures between 25° and 200° C. and at pressures between 5 and 50 ata., the molar ratio $HF/C_2F_4$ being between 2 and 25, the molar ratio $PbO_2/C_2F_4$ being between 0.1 and 2, and the molar ratio $I_2/C_2F_4$ being between 0.1 and 2.

According to a preferred form of embodiment of this invention one proceeds as follows: into an autoclave are introduced $PbO_2$ and $I_2$. The temperature of the autoclave is brought down to low values, for instance 0° C., and the air present in the autoclave is evacuated. The complete elimination of the air present in the autoclave is advisable in order to avoid the danger that part of the tetrafluoroethylene, which will be subsequently fed in, will yield polymerization in the presence of oxygen; also, by this technique it has proved to be unnecessary to have an inhibitor of polymerization (of the terpene B or hydroquinone or phenothiazine type), whose use, however, does not influence negatively the reaction.

The anhydrous HF is then introduced into the autoclave and the temperature of this latter is slowly increased under continuous stirring to reach a maximum between 80° and 160° C. The autoclave is then permitted to cool down, while stirring, for instance until 0° C., and $C_2F_4$ is fed in successive fractions in order to avoid overheating due to the exothermicity of the reaction. Thereupon, still keeping up the stirring, the temperature is gradually increased to reach temperatures around 125° C. and is then maintained constant at that level for about from 4 to 8 hours. The pressure inside the autoclave is between 20 and 40 ata.

At the end of the reaction the autoclave is left to cool down to relatively low temperatures, as for instance around 40° C., and is then discharged. The outflowing gases, after an alkaline washing, are partly condensed in a vessel cooled at a low temperature.

In certain cases an uncondensable fraction is collected as such. The condensed fraction is constituted by $C_2F_5I$, which represents more than 99% in moles with respect to the total of obtained products. The uncondensable fraction is constituted by unconverted $C_2F_4$, $C_2F_6$ and eventual quantities of $C_2F_5I$ dragged along by the gaseous current.

As solid residue one finds in the autoclave $PbF_2$ which may in the case be regenerated into $PbO_2$, by means of very simple methods, and it is thus recycled. However, this recovery is not indispensable in order to make the process more economical.

The reaction temperature is not critical and may vary within very wide limits; it is actually between 25 and 200° C., but preferably lies between 80° and 160° C.

The pressure at which the reaction is conducted, is not critical; substantially it is not limited towards the higher values but by technical difficulties inherent to the use of high pressures. In consequence thereof it is preferred to operate at pressures between 5 and 50 ata.; particular advantages are achieved by operating between 25 and 36 ata.

Furthermore it is possible to operate at higher pressures by introducing an inert gas (for instance nitrogen) to reach the desired pressure. This addition may promote the reaction but it has the disadvantage of complicating the separation of the products and the full recovery of the $C_2F_5I$ from the uncondensable gases.

The reaction according to the invention takes place by using molar ratios between the reactants substantially within the stoichiometric values of the reaction.

However, some reactants, for instance HF, may be used in excess in order to promote the conversion of all the $C_2F_4$ fed in. In this sense there are no limits to the use in excess of said reactants. Nevertheless, it is preferred to use the reactants in such molar ratios as to allow, with a reasonable excess of them over the fed in $C_2F_4$, a complete conversion of said $C_2F_4$, however avoiding simultaneously the useless handling of excessive quantities of reactants which would not be able to take part in the reaction and which would have to be re-cycled.

Therefore the molar ratio $HF/C_2F_4$ is between 2 and 25, but preferably between 10 and 20. The molar ratio $PbO_2/C_2F_4$ is between 0.1 and 2, but preferably between 0.5 and 1. The molar ratio $I_2/C_2F_4$ is between 0.1 and 2, but preferably between 0.5 and 1.

In order to better illustrate the inventive concept of this invention, some examples are given in the following, it being understood that they do not limit in any way the protective scope of this invention.

EXAMPLE 1

Into a stainless-steel 250-cc. autoclave were introduced 45 grams of $PbO_2$ (0.188 moles) and 100 grams (0.3939 moles) of finely ground $I_2$ disublimate. The autoclave was then cooled to 0° C., the air was evacuated by a vacuum pump and 140 grams (7 moles) of liquid anhydrous hydrofluoric acid were drawn in.

The temperature increased spontaneously to about 5° C.

The autoclave was then immersed in an oil bath and the temperature was gradually increased to reach a maximum of 125° C. in about 4 hours; the autoclave during that period was kept under constant stirring and the pressure rose to 14.2 ata. Still under stirring the autoclave was then permitted to cool down and, on reaching 0° C., 30 grams (0.30 moles) of $C_2F_4$ were introduced in fractions each of 3 grams. Thereupon, while still keeping the autoclave under stirring, the temperature was brought up again to 125° C. in 4 hours and was kept at 125° C. for another 4 hours. The pressure reached 30 ata.

On completion of the heating period, the mass is permitted to cool down to 40° C. and the gaseous products, washed with water at room temperature and then with a solution of NaOH at 20% titer in order to retain the hydrofluoric acid, were discharged. These products were then passed through a glass trap cooled at −50° C., while the residual part (uncondensed gases) passed on and was collected and measured.

The liquid that condensed in the trap weighed 49 grams and has a $C_2F_5I$ content of 99.6%; there were found only unidentifiable impurities.

A mixture of uncondensable gases was obtained having the following volumetric composition:

| | Percent |
|---|---|
| Air | 8.2 |
| $C_2F_6$ | 6.2 |
| $C_2F_4$ | 79.1 |
| $C_2F_5I$ | 6.5 |

The net yield in $C_2F_5I$ calculated on the converted $C_2F_4$ was 87%. The conversion of the $C_2F_4$ turned out to be 60%.

EXAMPLE 2

Into an autoclave with oscillating stirring was introduced an intimate mixture of 48 grams (0.201 moles) of R.P. (reagent purity) $PbO_2$ and 51 grams (0.202 moles) of finely ground $I_2$ disublimate.

Thereupon a vacuum was made with a mechanical pump and the temperature was brought down to −5° C. and 120 grams (60 moles) of anhydrous hydrofluoric acid were sucked in. The temperature was then rapidly raised to 125° C. and kept at this value for 2 hours while the measured pressure was 14.8 atmospheres.

Thereupon the mixture was left to cool down spontaneously and the temperature was then brought down to −5° C. after which it was started to add the tetrafluoroethylene in small fractions; at each addition a particularly pronounced pressure increase is observed in the autoclave if this kept steady, while the pressure increase is considerably less appreciable when the autoclave is kept in motion. By carrying on the additions of $C_2F_4$ it is necessary to reduce the temperature of the bath down to the value of −10° C. On the whole 30 grams of $C_2F_4$ were added, equal to 0.30 mole. At this point the autoclave was closed and heating was started, bringing in one hour the temperature up to 120° C. and keeping it at this value for 2 hours. The pressure grew up to 32 ata. After the heating, the mass was permitted to cool down to +50° C. and the products were discharged as in Example 1. By condensation were obtained 37 grams of pure $C_2F_5I$ equivalent to 0.15 mole, and 3.3 liters of gas almost exclusively constituted by unconverted $C_2F_4$. The net yield in $C_2F_5I$ with respect to the converted $C_2F_4$ amounts to 98%. The conversion of the $C_2F_4$ is 50%.

EXAMPLE 3

71.7 grams (0.3 mole) of $PbO_2$ and 76.15 grams (0.302 mole) of $I_2$ were ground together in a mortar and then put into a drier for 2 hours.

Thereupon the two products were introduced into an autoclave which was immediately put under vacuum and immersed in an oil bath at room temperature. Then, under continuous stirring, 120 grams (6 moles) of liquid anhydrous HF were introduced and immediately after the temperature was brought up to 128° C., maintaining it at this value for 6 hrs. and 45 minutes. Then the mass was permitted to cool down spontaneously overnight under stirring; thereupon feeding 30 grams (0.30 mole) of $C_2F_4$ was introduced in five separate fractions. The first fraction caused a pressure increase of 7.2 atm., which shortly dropped to 5.0 atm.; the second fraction brings the pressure up to 12 atm. to drop then to 9.5 atm.; the third brings to 14 atm. to drop then to 12.5 atm.

The fourth and fifth fractions cause a less pressure increase stopping at 16 atm. with a temperature of −10° C. Once the addition of $C_2F_4$ was accomplished the autoclave was heated under constant stirring at 125° C. for 6 hours, thereby attaining a pressure of 34 ata. After this the mass was left to cool down overnight and the product was then discharged by the system used in the preceding examples.

Thus 57 grams of $C_2F_5I$ equal to 0.232 mole and 950 cc. of unconverted $C_2F_4$ were obtained.

The yield in $C_2F_5I$ with respect to the $C_2F_4$ equals 90.0%.

The conversion of $C_2F_4$ equals 77%.

EXAMPLE 4

Into a 280 ml. autoclave a homogeneous mixture of 71.8 grams (0.3 mole) of $PbO_2$ and 75.9 grams (0.3 mole) of iodine bisublimate were fed in. The autoclave was then put under high vacuum for 20 minutes after which 133 grams (6.64 moles) of anhydrous hydrofluoric acid at room temperature was introduced by suction. The autoclave was then put under stirring and, by externally cooling it, 30 grams (0.3 mole) of gaseous $C_2F_4$ were fed, thereby attaining a pressure of 12 atm.

Thereupon, having immersed the autoclave into an oil bath, heating was started still under constant stirring bringing the temperature in 2 hours up to 128° C. and stabilizing it at this value for 5 hours. The internal pressure reached a maximum of 28 atm. to then stabilize itself at 26.1 atm. The whole was then left to cool down and was then discharged obtaining:

| | Moles |
|---|---|
| $C_2F_4$ | 0.070 |
| $C_2F_6$ | 0.010 |
| $C_2F_5I$ (36.9 grams) | 0.150 |

The conversion of the $C_2F_4$ amounted to 76.6%.

The net yield in products with respect to the converted $C_2F_4$ were:

| | Percent |
|---|---|
| $C_2F_6$ | 6.7 |
| $C_2F_5I$ | 65.0 |

EXAMPLE 5

74.7 grams (0.313 mole) of $PbO_2$ and 82 grams (0.324 mole) of $I_2$ were mixed by grinding them together, they were then loaded into an autoclave, after which 125 grams (6.26 moles) of hydrofluoric acid were introduced under vacuum. Thereupon, under constant stirring, after an hour, 30 grams (0.3 mole) of gaseous $C_2F_4$ were fed in. The whole was then heated in an oil bath up to 160° C. for 6 hours, reaching a pressure of 36.9 ata., after which the autoclave was cooled down and discharged in the same way as described in the preceding examples.

Thereby the following products were obtained:

| | Moles |
|---|---|
| $C_2F_6$ | 0.058 |
| $C_2F_4$ | 0.084 |
| $C_2F_5I$ (24.1 grams) | 0.098 |

The conversion of the $C_2F_4$ amounts to 76.9%.

The net yields of the products with respect to the converted $C_2F_4$ were:

| | Percent |
|---|---|
| $C_2F_6$ | 26.8 |
| $C_2F_5I$ | 45.4 |

EXAMPLE 6

Into an autoclave are fed 0.3 mole (74.7 grams) of $PbO_2$, 0.3 mole (82 grams) of $I_2$ and 7.5 moles (150 grams) of liquid anhydrous HF. The whole is then heated for 5 hours at 125° C., after which it is cooled down and 0.3 mole (30 grams) of $C_2F_4$ are added; thereupon it is heated once again under stirring for 6 hours at 125° C. Once again the mass is brought down again to 30° C. and the gaseous products are discharged obtaining:

| | Moles |
|---|---|
| $C_2F_6$ | 0.025 |
| $C_2F_4$ | 0.045 |
| $C_2F_5I$ (48.7 grams) | 0.199 |
| High boiling products | 0.001 |

Thereupon a further 30 grams of $C_2F_4$ are introduced following the same procedure and the following gaseous products were then discharged:

| | Moles |
|---|---|
| $C_2F_6$ | 0.001 |
| $C_2F_4$ | 0.064 |
| $C_2F_5I$ (50 grams) | 0.203 |
| High boiling products | 0.002 |

Then, once again were introduced 30 grams of $C_2F_4$, operating as before and the following products were discharged:

| | Moles |
|---|---|
| $C_2F_4$ | 0.198 |
| $C_2F_5I$ (29.5 grams) | 0.012 |
| $C_2F_4I_2$ | 0.060 |

The total losses amounted to 10%, while the conversion of the $C_2F_4$ was 66%. The net yields calculated on the converted $C_2F_4$ amounted to:

| | Percent |
|---|---|
| $C_2F_6$ | 4.2 |
| $C_2F_5I$ | 69.6 |
| $C_2F_4I_2$ | 10.7 |

EXAMPLE 7

35.8 grams (0.15 mole) of $PbO_2$ and 30 grams (0.15 mole) of $I_2$ were mixed by grinding and were then fed into an autoclave. Into this were furthermore introduced under vacuum 128 grams (6.4 moles) of anhydrous hydrofluoric acid.

Under stirring, the temperature was then brought up to 80° C. and maintained at this value for 2.5 hours. The autoclave was then permitted to cool down and then 30.2 grams (0.302 mole) of gaseous $C_2F_4$ were added.

The whole was then heated up to 80° C. and maintained at this temperature for 15 hours, thereby reaching a pressure of 23 ata. After this the autoclave was cooled down and discharged.

The following products were obtained:

| | Moles |
|---|---|
| $C_2F_5I$ | 0.041 |
| $C_2F_4I_2$ | 0.028 |
| $C_2F_4$ | 0.233 |

The conversion of the $C_2F_4$ amounted to 23.2%.

The net yields of the products calculated on the converted $C_2F_4$ were:

| | Percent |
|---|---|
| $C_2F_5I$ | 59.4 |
| $C_2F_4I_2$ | 40.6 |

What we claim is:

1. A process for the production of iodopentafluoroethane, comprising the step of reacting HF, $PbO_2$ and $I_2$ with $C_2F_4$, at a temperature between 25° C. and 200° C. and at a pressure between 5 and 50 ata., the molar ratio $HF/C_2F_4$ being between 2 and 25, the molar ratio $PbO_2/C_2F_4$ being between 0.1 and 2, and the molar ratio $I_2/C_2F_4$ being between 0.1 and 2.

2. A process according to claim 1 wherein said temperature is between 80° C. and 160° C.

3. A process according to claim 1 wherein said pressure is between 25 and 36 ata.

4. A process according to claim 1 wherein the molar ratio $HF/C_2F_4$ is between 10 and 20.

5. A process according to claim 1 wherein the molar ratio $PbO_2/C_2F_4$ is between 0.5 and 1.

6. A process according to claim 1 wherein the molar ratio $I_2/C_2F_4$ is between 0.5 and 1.

References Cited

UNITED STATES PATENTS

| 2,466,189 | 4/1949 | Waalkes | 260—653.6 |
| 3,140,320 | 7/1964 | Weinmayr | 260—653.6 |

DANIEL D. HORWITZ, Primary Examiner